United States Patent [19]

Woffinden et al.

[11] Patent Number: 5,095,424
[45] Date of Patent: Mar. 10, 1992

[54] COMPUTER SYSTEM ARCHITECTURE IMPLEMENTING SPLIT INSTRUCTION AND OPERAND CACHE LINE-PAIR-STATE MANAGEMENT

[75] Inventors: Gary A. Woffinden, Scotts Valley; Theodore S. Robinson; Jeffrey A. Thomas, both of Cupertino; Robert A. Ertl, Santa Clara; James P. Millar, Santa Clara; Christopher D. Finan, Santa Clara; Joseph A. Petolino, Palo Alto; Ajay Shah; Shen H. Wang, both of San Jose; Mark Semmelmeyer, Sunnyvale, all of Calif.

[73] Assignee: Amdahl Corporation, Sunnyvale, Calif.

[21] Appl. No.: 384,867

[22] Filed: Jul. 21, 1989

Related U.S. Application Data

[63] Continuation of Ser. No. 920,707, Oct. 17, 1986, abandoned.

[51] Int. Cl.$^5$ .............................................. G06F 12/02
[52] U.S. Cl. ................................. 395/425; 364/222.82; 364/222.81; 364/243.44; 364/260; 364/DIG. 1
[58] Field of Search ... 364/200 MS File, 900 MS File

[56] References Cited

U.S. PATENT DOCUMENTS

| 4,464,712 | 8/1984 | Fletcher | 364/200 |
|---|---|---|---|
| 4,502,110 | 2/1985 | Saito | 364/200 |
| 4,521,851 | 6/1985 | Trubisky | 364/200 |
| 4,527,238 | 7/1985 | Ryan et al. | 364/200 |
| 4,620,274 | 10/1986 | Boothroyd et al. | 364/200 |
| 4,670,839 | 6/1987 | Pilat | 364/200 |
| 4,680,702 | 7/1987 | McCarthy | 364/200 |
| 4,707,784 | 11/1987 | Ryan et al. | 364/200 |
| 4,727,484 | 2/1988 | Saito | 364/200 |
| 4,731,739 | 3/1988 | Woffinden et al. | 364/200 |

Primary Examiner—Thomas C. Lee
Assistant Examiner—Eric Coleman
Attorney, Agent, or Firm—Fliesler, Dubb, Meyer & Lovejoy

[57] ABSTRACT

A computer system architecture implementing multiple central processing units, each including a split instruction and operand cache, and that provides for the management of multiple copies (line pairs) of a memory line through the use of a line pair state is described. Systematic management of memory lines when transferred with respect to instruction and operand data cache memories allows the integrity of the system to be maintained at all times. The split cache architecture management determines whether a memory line having a first predetermined system address is present within both the instruction and operand cache memories or will be upon move-in of a memory line. Address tag line pair state information is maintained to allow determinations of whether and where the respective memory line pair members reside. The architecture implements the management of the line pairs on each transfer of a memory line to any of the split caches of the system. A line pair is allowed to exist whenever the same memory line exists in the same relative location in each of the instruction and operand cache buffers of a single central processor. The architecture further includes a data path selector for transferring operand data to either the instruction or operand data cache buffers, or both, depending on whether the operand buffer destination is a memory line that is a member of a line pair.

12 Claims, 1 Drawing Sheet

COMPUTER SYSTEM ARCHITECTURE IMPLEMENTING SPLIT INSTRUCTION AND OPERAND CACHE LINE-PAIR-STATE MANAGEMENT

This application is a continuation of Ser. No. 920,707, filed May 17, 1986, now abandoned.

FIELD OF THE INVENTION

The present invention generally relates to cache memory based central processing unit (CPU) architectures employed in high performance data processing systems and, in particular, to a split cache based CPU architecture that provides for the efficient, control and management of respective instruction and operand data caches, particularly where application program instructions and their respective data are closely intermixed in the application program.

BACKGROUND OF THE INVENTION

Cache memories are used in CPU architectures to improve the access time of CPU requested instructions and operand data. Typically, a cache memory is a relatively low capacity, high-speed memory intimately coupled to a single CPU. Such cache memories are described as being 'local' with respect to their immediately associated CPU. Cache memories are thus quite distinct from the substantially larger, though significantly slower, main store memory unit that is typically implemented as a device common to all CPUs of the data processing system.

A number of considerations are involved in the utilization of cache memories Conventional cache memories provide selective, temporary storage of lines of instructions and operand data following transfer from the mainstore to the CPU. Closely subsequent requests for cache stored instructions or operand data are satisfied locally by accesses of the current copy present in the local cache memory. The determination of whether any particular CPU request can be satisfied by accessing the local cache memory is made by a CPU Storage Unit (SU) commonly including a cache controller, intimately also coupled to the local cache. Typically, the cache controller maintains a tag list identifying the instructions and data lines present in its cache. Where a request cannot be satisfied by a cache memory access, the storage unit passes the request to the mainstore memory unit for subsequent completion. A copy of the data line containing the requested instructions or operand data is placed in the local cache memory of the CPU. Thus, the cache memory can be described as having a 'CPU' side interface, where instructions and operand data are passed back and forth between the CPU and cache memory, and a 'mainstore side' interface that is coupled between the cache memory and the main store memory unit for the transfer of instructions and operand data lines.

Given the finite capacity of the cache memory, typical CPU requests that require instructions and operand data to be sourced from the main store memory unit further require the prior transfer of a data line from the cache memory to main store to free up adequate storage space for the currently requested instructions or data. This management of the local cache memory contents is typically considered a low level, or fundamental, system integrity function.

A consequence of this system integrity function is that satisfaction of the CPU instruction or operand memory line request is significantly delayed by the swapping out of a cache line to mainstore. The swap delay can be reduced by temporarily buffering the swapped out memory line rather than writing it directly to mainstore. Once buffered, the requested memory line can be transferred into the cache. However, the temporarily buffered data line must then be immediately written out to mainstore to ensure its availability potentially for the immediately subsequent CPU request. Thus, the swap out delay is again encountered whenever there are closely successive CPU requests for new memory lines. Consequently, the CPU benefits from a significantly higher CPU-side cache instruction and operand data bus bandwidth whenever requests can be directly satisfied by accesses to the local cache memory. However, the CPU is generally limited to the significantly lower mainstore memory-side cache data line bus bandwidth limit where instruction or operand data is only available from mainstore.

Another complication in the use of cache memories is that typical mainframe data processing architectures utilize a segmented or pipelined processing structure for the simultaneous, though staggered, execution of instructions and the processing of respective operand data. As a result, access conflicts arise between the various pipeline segments when trying to retrieve instruction and operand data present in the cache memory. A solution to this problem is obtained by providing separate caches for instructions and operand data. Such split-cache architectures allow the instruction execution pipeline segments to compete with their operand data manipulation counterparts for access to the respective instruction and operand data caches.

Unfortunately, a significant problem arises by the use of a split cache architecture. Typically, all requests for instruction and operand data from the main store memory unit are satisfied by the transfer of an entire memory line to the requesting CPU. Each line will contain the requested instruction or operand data embedded in the line along with all of the instructions and operand data sharing the same line address. Where a request is made for operand data, the corresponding memory line is stored specifically to the operand data cache. Conversely, an instruction request results in the storage of the memory line in the instruction cache. Consequently, a copy of specific operand data may appear in both the instruction and operand data caches. This gives rise to a data integrity problem. If operand data is modified by the CPU and stored back to the operand data cache, incorrect operation of the CPU will result if the instruction cache copy of the operand data is subsequently accessed as an integral part of an executable instruction. Therefore, the data integrity maintenance function of split cache data processing systems must either invalidate or write out all memory lines sharing the request specified line address to the mainstore memory unit before satisfying a request for modifiable operand data. This insures that the mainstore memory is properly updated and that only one modifiable copy of the memory line requested exists outside of mainstore. Similarly, whenever an instruction memory line request must be satisfied, where that memory line already exists as a modifiable memory line in an operand data cache memory, the operand data memory line must be either written out to the mainstore memory unit, if modified, or invalidated to preclude modification and ensure that the single most recently modified memory line is returned to the requesting CPU.

Normally, where the modifiable application program data is maintained distinctly separate from the executable code portion of the application program, the split cache data integrity function is rarely invoked. Thus, there is little impact on system performance. However, a condition typically referred to as 'thrashing' will occur where the application program instruction code and potentially modifiable operand data are closely intermixed, such as to both occur frequently in memory lines of the application program. That is, a memory line containing both instructions and operand data may be fetched and copied to the instruction cache only to be immediately invalidated to allow a subsequent modifiable operand data request to be satisfied from the same memory line. A closely subsequent instruction request to execute the same or next instruction will cause the modified memory line to be written back out to main store only to then be fetched back to the instruction cache memory. These steps may occur repeatedly and in close order particularly where the application program calls for the execution of a short program execution loop. Consequently, a significant and distinctly undesirable CPU performance degradation will occur.

SUMMARY OF THE INVENTION

Therefore, a purpose of the present invention is to provide a control system to operate a split cache, multiple CPU architecture computer system without compromise of CPU performance while preserving system integrity and regardless of whether instructions and operand data are closely intermixed.

This is accomplished in the present invention by the systematic management of memory line pairs whenever a memory line transfer occurs with respect to instruction and operand memory line buffers of any split cache in a multiple CPU computer system architecture. Each data line has an associated system memory address. The split cache architecture includes a first stage search means for determining whether a data line having a first predetermined system address is present within both the instruction and operand cache memories. The first stage search means provides a condition result indicative of whether and where the memory line resides. Also included is a data path selector means, responsive to the first stage search means, for transferring the data line having the first predetermined system memory address to either the instruction or operand data cache memories, or both, depending on the condition result determined by the first tag search means.

In implementing the basic capabilities of the present invention, an instruction and operand data (IF/OP) line pair bit is defined in the tag storage areas for both the instruction and operand data cache memories. Additionally, the tag storage locations provide for the storage of sufficient information, either implicitly or explicitly to identify the respective data and instruction line locations within the instruction and operand cache memories for each memory line pair.

Thus, an advantage of the present invention is that it provides an efficient architectural mechanism for managing split cache memories in a multiple CPU computer architecture without system performance degradation and while preserving system integrity.

Another advantage of the present invention is that all significant architectural features of the present split a cache controller may be implemented to execute in parallel with existing preferred or required architectural functions of the central processing unit and the system integrity function of the system controller.

A further advantage of the present invention is that its implementation is essentially independent of the number of CPUs present in the data processing system.

Yet another advantage of the present invention is that it makes optimal use of existing architectural features of the data processing system particularly including the provision of a system controller tag buffer as a basis for providing system wide data integrity.

A still further advantage of the present invention is that it reduces, if not eliminates the occurrence of memory line thrashing between the instruction and operand buffers of a split cache.

BRIEF DESCRIPTION OF THE DRAWINGS

These and other attendant advantages of the present invention will become apparent and readily appreciated as the same becomes better understood by reference to the following detailed description of the invention when considered in conjunction with the accompanying drawings, wherein like reference numerals designate like parts throughout the figures thereof, and wherein.

DETAILED DESCRIPTION OF THE INVENTION

Figure 1:
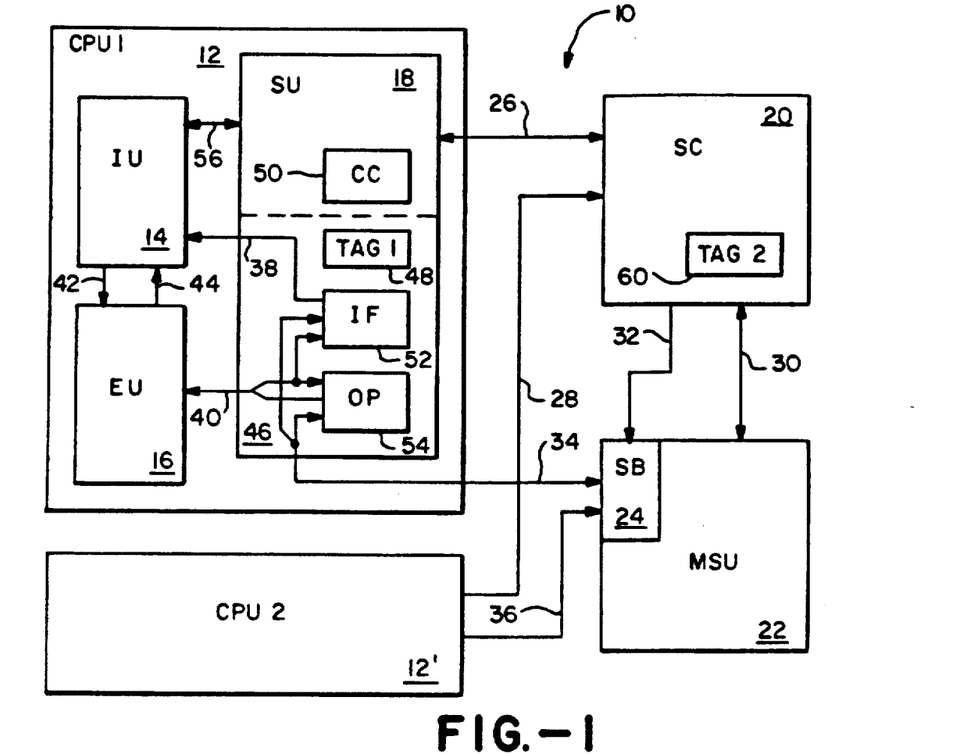
FIG. 1 is simplified block diagram of a split cache, multiple CPU architecture data processing system incorporating a preferred embodiment of the present invention.

The principal elements of a preferred split cache, multiple central processing unit (CPU) data processing system 10 are shown in FIG. 1. Included are a first CPU 12, an identical though optional second CPU 12', a system controller (SC) 20 and a mainstore memory unit (MSU) 22 with a closely allied memory line routing switch box (SB) 24.

The system controller 20 operates as the designated focal point for all system requests for access to the mainstore memory unit 22. Such requests are received by the system controller 20 via the request control lines 26 from the CPU 12. Other requests may be provided to the system controller 20 via the request control lines 28 from other elements of the data processing system 10 including, in particular, such as the second CPU 12'. Accordingly, the system controller 20 implements arbitration and control logic to orderly manage mainstore memory unit access requests and to supervise each resulting memory access by the application of mainstore control signals via the mainstore memory control lines 30.

A mainstore memory unit access typically involves the transfer of a full memory line to or from the mainstore memory unit 22. Each such memory line is composed of 64 bytes of data. All memory line transfers are dispatched through the switch box 24 by the system controller 20 based on route select control signals applied via the switch box control lines 32. As shown, the switch box 22 is connected to the two separate CPUs 12, 12' by the respective CPU memory line data busses 34, 36. The switch box 24 supports bypass transfer routing of memory lines between the CPUs 12, 12' as well as bidirectional memory line transfers with respect to the mainstore memory unit 22.

The preferred embodiment of the CPU 12 (and identically the CPU 12') includes an instruction unit (IU) 14, execution unit (EU) 16 and a storage unit (SU) 18 as its principal functional blocks. The instruction unit 14 implements a pipelined instruction processing function that provides for the segmented and staggered sequential execution of instructions generally in the sequence received via a CPU-internal instruction fetch bus 38. The execution unit 16 provides for the processing of operand data received via a CPU-internal operand data bus 40. The specific nature of the operand data processing function performed by the execution unit 16 is typically specified by and managed through the execution of respective instructions by the instruction unit 14. That is, during the staged execution of each instruction, the instruction unit 14 provides execution unit control signals via the CPU internal execution unit control bus 42 to select and direct the corresponding processing of operand data accompanying or referenced by an instruction. In turn, execution result status signals derived from the processing of operand data are provided back to the instruction unit 14 via lines 44.

The storage unit 18 specifically functions to support the fetch and store requirements of the instruction and execution units 14, 16. For this purpose, a split cache memory 46, including an address tag buffer (Tag 1) 48, and a cache controller (CC) 50 are provided as component elements of the storage unit 18. The split cache memory 46 provides for the temporary storage of mainstore memory lines in an instruction buffer (IF) 52 and an operand buffer (OP) 54. The Tag 1 buffer 48 stores the address tag associated with each memory line present in the split cache 46. Requests from the instruction unit 14 for instructions, each identified by address, are presented to the storage unit 18 via an instruction request bus 56. Requests to receive or store operands, also identified by address, are placed on behalf of the execution unit 16 by the instruction unit 14. The storage unit 18 initially responds to each such request by invoking the cache controller (CC) 50 to determine whether the request can be satisfied by an immediate access of either the instruction or operand buffer 52, 54. In general, the cache controller 50 makes this determination based on an examination of the address tags currently stored in the Tag 1 buffer 48. If a request cannot be immediately satisfied by an instruction or operand buffer access, the request including the address of the requested instruction or operand is passed by the storage unit 18 to the system controller 20 via CPU request lines 26. In general, a mainstore memory line containing the requested instruction or operand is then accessed and returned from the mainstore unit 22 via the switch box 24 under the cooperative control of the storage unit 18 and system controller 20 by way of the first CPU data bus 34. The memory line returned is generally stored in either the instruction or operand buffer 52, 54 of the split cache memory 46 depending on whether the request was originally for an instruction or an operand. The address tag accompanying the returned memory line is stored in a logically corresponding location within the Tag 1 buffer 48.

In the preferred embodiment of the present invention, the instruction and operand data buffers 52, 54 and the Tag 1 buffer 48 are implemented in high-speed memory. The instruction buffer 52 provides for the set associative storage of 256 memory lines of 64 bytes in each of two instruction buffer memory banks. Similarly, the operand buffer 54 provides for the set associative storage of 512 memory lines in each of two operand buffer memory banks. The memory banks in each pair of buffer memory banks are respectively identified as A and B associativities.

The Tag 1 buffer 48 is implemented as a set associative memory physically as well as logically corresponding to the instruction and operand buffers 52, 54. That is, the Tag 1 buffer 48 is implemented with an address tag storage location corresponding to each of the possible 1,536 split cache stored memory lines. Each of these 1,536 Tag 1 buffer storage locations provides for the storage of a full memory line address tag, including the system address and control data associated with the memory line. This control data is used principally for the management of the memory line while present outside of the mainstore unit 22.

The entire split cache 46 is operated as part of a virtual cache system utilizing a virtual or effective addressing scheme as opposed to conventional real or system address cache systems. For purposes of the present invention, the effective address of a memory line when present in either the instruction or operand buffer 52, 54 is simply its cache address. System address bits $<SA26:31>$ provide sufficient address definition to uniquely specify any byte in a single 64 byte memory line. Based on the memory line storage requirements of the instruction and operand buffers 52, 54, any memory line in the cache buffers can be uniquely specified by effective address bits $<EA17:25>$; the combined address of EA17:25 and SA26:31 uniquely specifying a single split cache stored byte. Effective address bit $<EA17>$, however, is only required with respect to the operand buffer 54, given that the operand buffer 54 stores twice as many memory lines as the instruction buffer 52. Table I illustrates the relationship between system and effective addresses for purposes of the present invention.

TABLE I

| Cache or Effective | Addressing Scheme System | Description |
|---|---|---|
| — | $SA<3:19>$ | Page Address |
| SU | — | SU Select |
| OP/IF | — | OP/IF Select |
| A/B | — | Associativity |
| $EA<17:25>$ | — | Cache address/ Tag Index |
| $EA<20:25>$ | $SA<20:25>$ | Line in Page Index |
| $EA<26:31>$ | $SA<26:31>$ | Byte in Line Index |

Table II summarizes the principle address and control fields of a memory line address tag as stored in the Tag 1 buffer 48.

TABLE II

| Tag 1 Address Tag Fields | #Bits |
|---|---|
| Implied | |
| Tag Index $<EA17:25>$ | — |
| IF/OP Associativity | — |
| Explicit | |
| System Address $<SA3:19>$ | 17 |
| Tag Valid | 1 |
| IF/OP Line Pair | 1 |
| IF/OP Pair Associativity | 1 |
| EA17 of OP Pair | 1* |
| Public/Private | 1** |

TABLE II-continued

| Tag 1 Address Tag Fields | #Bits |
|---|---|
| OP Line Modified | 1** |

*Used only for IF address tags
**Used only for OP address tags

Although full system addresses are 32 bits long (bit <SA0> being the most significant bit), the Tag 1 address tags need explicitly store only system address bits <SA3:19>. Entire memory lines are stored by the Tag 1 buffer 48 thereby obviating the need to explicitly store a memory line's in-line byte identifying bits <SA26:31> as part of the address tag. In addition, the tag index and associativity bit need not be explicitly stored. Sets of Tag 1 storage locations are logically mapped to associativity sets of either instruction or operand buffer storage locations. An address tag is stored in one of a set of Tag 1 buffer locations uniquely corresponding to the associativity set of memory line storage locations that store its memory line. Both the address tag and its memory line are stored in the same associativity of their respective Tag 1 and instruction or operand buffers, 48, 52, 54. In storing a memory line into the cache 46, the choice of an associativity set of memory line storage locations is based on the tag index bits <EA17:25> of the line being stored. The address tag is stored in the same tag index and associativity referenced storage location in either the instruction or operand portion of the Tag 1 buffer. Thereafter, the tag index and associativity of that or any other memory line in the split cache 46 can be directly determined from the buffer relative storage location of its associated address tag within the Tag 1 buffer 26.

The remaining control data fields maintained as part of a Tag 1 address tag include tag valid, line pair, public/private and modified data bits. The tag valid bit indicates whether the current address tag and its associated memory line are valid. If the associated memory line occurs in the operand buffer 54, then the public/private bit determines whether the CPU 12, 12' has private (read/write access) privileges to that particular memory line while present in its local cache 46. The modified memory line bit flags whether the memory line has indeed been modified by a write access.

The line pair bit of the Tag 1 address tag is used to indicate whether a memory line is duplicated in the complementary buffer of the split cache 46. That is, in accordance with the present invention, an instruction and a private operand copy of a single memory line can be simultaneously present and properly managed in the split cache 46 under certain conditions. In general, these conditions include that the two memory line copies exist in the respective instruction and operand buffers 52, 54 of a single split cache 46, both memory lines must have the same system address and both memory lines have the same tag index. A pair of memory lines in a split cache 46 meeting these conditions is defined as a line pair. The line pair bit is set in the address tags of both memory line members of the line pair. Since memory lines having the same tag index need not be stored in the same associativity of the instruction and operand buffers 52, 54, an additional pair associativity bit is maintained explicitly in each address tag to identify the associativity of the other member of the line pair. A copy of the effective address bit EA17 is also kept in the address tags of instruction memory line pair members. The tag index of instruction memory lines is fully specified by effective addresses <EA18:25> with the state of EA17 being undefined. Thus a copy of the effective address bit <EA17> must be kept to allow the unique identification of the operand member of the line pair based on only bits <EA18:25> of the instruction's tag index.

The management of line pairs follows the following rules: a copy of a public (read access only allowed) memory line can exist in each of the buffers 52, 54 of the CPUs 12, 12'; only a single copy of a private (write access privileged) memory line can exist in any one of the operand buffers 54 of the CPUs 12, 12' (instruction buffer memory lines always being held public); and a line pair of a specific memory line can exist in any one split cache 46 where the line pair members are stored in the respective instruction and operand buffers 52, 54 and where the operand buffer member of the line pair is held with private access privileges. Whenever these management rules and conditions are or will be met with regard to two copies of a single memory line, a line pair is created. The address tag of each member of the pair is updated to reflect its status as a member of a line pair and to include the associativity and, if necessary, the operand effective address bit <EA17> of its pair member. Thus, any number of line pairs of different memory lines may exist in the split caches 46 of the CPUs 12, 12' of the data processor 10. So long as the rules and conditions for the existence of line pairs continue to be met, the line pairs will remain intact. If a condition or rule fails, the line pair state will be destroyed. That is, the respective address tags of the line pair are accessed and their line pair bits are reset and marked public or marked invalid. For example, if a line pair is held in the split cache 46 of the first CPU 12 and the system controller 20 receives a CPU 12' request for the same memory line but with private access privileges and the operand member of the line pair has not been modified, both copies of the line pair are simply invalidated during the course of the data integrity function carried out by the system controller 20 prior to transferring a new copy of the requested private memory line to the CPU 12'. A request for the memory line with public access privilege by the second CPU 12' is handled differently only to the extent that the line pair status of both line pair address tags are reset and the operand address tag is marked public. If, however, the operand member of the line pair held by the split cache 46 of the first CPU 12 has been modified then the data integrity function of the system controller 20 will perform a data integrity move-out (DIMO) of the modified memory line for storage in the mainstore 22 prior to marking both members of the line pair invalid in the split cache 46 of the CPU 12. If, then, the second CPU 12' makes a subsequent move-in request of the system controller 20 for the same memory line with respect to its instruction buffer 52, the system controller 20 will create a line pair in the split cache 46 of the CPU 12' upon move-in of the requested instruction memory line. The creation of the line pair is achieved by updating of the address tags of both members of the new line pair. Finally, if the second CPU 12' makes another unrelated request of the system controller 20 for the move-in of a memory line having the same tag index as one member of a line pair already present in its split cache 46, though having a different system address, the system controller 20 will destroy the existing line pair in performing its data integrity function. If the destination of the requested memory line is the operand buffer 54 and the operand member of the line pair has been modified, an operand memory line swap move-out is performed. In any case, the address tags of the line pair are then accessed, both line pair bits are reset and the move-in destination buffer line pair member is marked invalid. If the destination buffer is the instruction buffer or the operand line pair member has not been modified, the system controller 20 performs only the data integrity tag access operation, or short move-out. The requested memory line move-in is then performed with another access of the corresponding memory line address tag to mark it valid and to write the new system address and other control data to fully reflect the presence of the newly moved-in memory line.

The management of line pair states throughout the data processing system 10 is cooperatively handled by the storage unit 18 of both the CPUs 12, 12' and the system controller 20. In order to obviate the need to query the Tag 1 buffers 48 of the CPUs 12, 12' in response to every memory line request, the system controller 20 implements its own address tag (Tag 2) buffer 60. The Tag 2 buffer 60 contains a number of Tag 2 address tag storage locations equal to the combined number of storage locations in the Tag 1 buffers 48 of the CPUs 12, 12'. Table III summarizes the Tag 2 address tag fields maintained for each address tag location within the Tag 2 buffer 60.

TABLE III

| Tag 2 Tag Fields | #Bits |
| --- | --- |
| Implied | |
| SU Identifier | — |
| Tag Index<EA17:25> | — |
| IF/OP Associativity | — |
| Explicit | |
| System Address<SA3:19> | 17 |
| Tag Valid | 1 |

The physical structure of the Tag 2 buffer 60 allows the Tag 2 address tag storage locations to be logically mapped to the respective Tag 1 buffer storage locations for both Tag 1 buffers 48 of the CPUs 12, 12'. By design, the system controller 20 stores its Tag 2 address tag within the Tag 2 buffer 60 at the logically corresponding location as the Tag 1 address tag is stored by either cache controller 50 in its associated Tag 1 buffer 48 of either CPU 12, 12'. Consequently, the storage unit identifier, tag index and associativity are all directly implied by the specific location where an address tag is stored in the Tag 2 buffer 60.

The explicit storage requirements of the Tag 2 buffer 60 is therefore limited to the system address <SA3:19> of the address tags corresponding memory line, one bit to indicate whether the tag is valid and one bit to indicate whether the memory line is being held with either public or private access privileges. A typical request made to the system controller 20 is for a memory line move-in (MI). Given that the split cache buffers 52, 54 of the requesting CPU are typically always nearly full, a request for a move-in of yet another memory line will require the prior swap move-out (MO) of a memory line to make room for the requested move-in memory line. The swap move-out line is the memory line currently occupying the buffer storage location that is to be the destination of the move-in requested memory line. Table IV summarizes the request information presented to the system controller 20 as part of a move-in request.

TABLE IV

| Move-In Request | #Bits |
| --- | --- |
| Move In Op Code | 8 |
| SU Identifier (implied) | — |
| System Address<SA3:19> | 17 |
| IF/OP Memory Line Request | 1 |
| Associativity | 1 |
| Tag Index<EA17:25> | 9* |
| Public/Private | —+ |
| Swap Public/Private | 1# |
| OP Line Modified | 1# |
| IF/OP Line Pair | 1# |
| IF/OP Pair Associativity | 1# |
| EA17 of OP Pair | 1#** |

+ Part of the Op Code
*Only EA18:25 if an IF Line Request
**Only used for IF Line Requests
Swap move-out replacement control data The move-in Op Code directs the system controller 20 to perform a move-in process. Table V summarizes the system controller process that is invoked in response to a move-in Op Code request.

TABLE V

Move-In System Controller Process

By the implementation of the preferred embodiment of the present invention, the system controller 20 is able to independently identify the source of each request. Thus, the storage unit identifier is implied. The move-in request explicitly identifies the move-in requested memory line by providing its system address <SA3:19> and tag index <EA17:25>. In addition, the request indicates whether the memory line destination is to be the instruction or operand buffer 52, 54 and whether public or private access privilege to the memory line is required. From this essential move-in information, the system controller is able to uniquely identify the memory line that must be swap moved-out prior to the requested memory line being moved-in.

To facilitate the swap move-out, the requesting storage unit 18 also provides, as part of its move-in request, control information regarding the swap move-out memory line. The public/private privilege and modified bits of the memory line to be swap moved-out are provided to allow the system controller 20 to determine whether a long or a short operand memory line swap move-out need be performed. If the swap move-out memory line is located in the instruction buffer 52, the move-out is always effected by a short move-out to mark the instruction memory line as being invalid in the instruction Tag 1 buffer. Additionally, the line pair, pair associativity and pair EA17 bits are provided so that the system controller 20 can locate and update the remaining line pair member address tag at the end of either the long or short swap move-out to reset its line pair state bit.

Given the information contained in the move-in request, the system controller 20 initiates the required memory line swap move-out from the requesting storage unit 18 as soon as the request is received and accepted. Table VI summarizes the request information presented to the system controller 20 to initiate the swap move-out.

TABLE VI

| Swap Move-Out Request | #Bits |
|---|---|
| Swap Move-Out Op Code | 8 |
| IF/OP Memory Line | —+ |
| Long/Short | —+ |
| Associativity | 1 |
| Tag Index <EA17:25> | 9* |
| IF/OP Line Pair | 1 |
| IF/OP Pair Associativity | 1 |
| EA17 of OP Pair | 1** |

+ Part of the Op Code
*Only EA18:25 if an IF Line Request
**Only used for IF Line Requests The swap move-out request Op Code identifies for the cache controller 50 whether to the move-out memory line is in the instruction or operand buffer, whether it is part of a line pair and whether to perform a long or short move-out with respect to the operand memory line if it is to be moved-out.

A mainstore access is also initiated immediately to begin the process of obtaining the requested move-in memory line. The data integrity function of the system controller 20 is also simultaneously invoked. That is, a data integrity (DI) search of the address tags in the Tag 2 buffer 60 is performed to determine whether and where any copies of the requested memory line exist outside of the mainstore unit 22. The entire data integrity search of the Tag 2 buffer 60 is completed in a sequence of four search cycles. The physical structure of the Tag 2 buffer 60 and the search circuitry allows simultaneous access to one address tag location for each combination of storage unit, instruction buffer, operand buffer (including both EA17 halves), and associativities during each search cycle. The search location is defined by the effective address bits <EA18:25> of the move-in request. Since effective address bits <EA20:25> are the same as system address bits <SA20:25> the search location within the Tag 2 buffer 60 is known for these bits <EA20:25> for purposes of the data integrity search. However, virtual address synonyms may exist with respect to effective address bits <EA18:19>. Thus, all synonyms of the requested memory line are checked in the Tag 2 buffer 60 by incrementing the value of effective address bits <EA18:19> after each data integrity search cycle beginning with the EA18:19 value provided with the move-in request. The search results returned at the conclusion of each data integrity search cycle for each of the locations within the Tag 2 buffer 60 searched is summarized in Table VII. During each Tag 2 search cycle, the system address <SA3:19> is compared to that of every Tag 2 address tag accessed. A match occurs whenever the two system addresses compare equal. If two matching memory lines are found that further meet the conditions and rules for the existence of a line pair, the system controller 20 assumes that the memory lines are in fact members of a line pair.

TABLE VII

| DI Search Results | |
|---|---|
| DI Match Result Fields | #Bits |
| Implied | |
| Matching Line Found | — |
| Member of a Line Pair | — |
| Explicit | |
| SU Identifier | 1 |
| IF/OP Associativity | 1 |
| OP EA17 | 1* |
| Potential Line Pair Make on MI | 1 |

*Used only in OP Tag 2 Matches

With each data integrity search match in the Tag 2 buffer 60, the system controller 20 is able to identify the unique storage location of the matching memory line in either of the split caches 46 of the CPUs 12, 12'. In general, the system controller 20 initiates a data integrity move-out (DIMO) with respect to each matching memory line found as a consequence of the data integrity search. That is, for each copy of the move-in requested memory line found during the Tag 2 buffer search, the system controller 20 itself places a data integrity move-out request back to the storage unit 18 that contains a found memory line copy. Table VIII summarizes the information provided to a storage unit 18 as part of a data integrity move-out request.

TABLE VIII

| DI MO Request | #Bits |
|---|---|
| DIMO Op Code | 8 |
| IF/OP Memory Line | —+ |
| Long/Short | —+ |
| System Address <SA3:19> | 17 |
| Associativity | 1 |
| Tag Index <EA17:25> | 9* |
| IF/OP Line Pair | —+ |
| IF/OP Pair Associativity | 1 |
| EA17 of OP Pair | 1** |

+ Part of the Op Code
*Only EA18:25 if an IF Line Request
**Only used for IF Line Requests The information provided as part of the data integrity move-out request is essentially that necessary for the storage unit 18 receiving the request to identify a unique memory line within its split cache 46. The data integrity move-out request Op Code identifies for the cache controller 50 whether the move-out memory line is in the instruction or operand buffer and whether it is to be treated as part of a line pair. Normally, the Op Code will specify a long move-out with respect to an operand memory line if it is held private. Otherwise, short move-outs are specified. The type of the data integrity operand move-out actually performed is qualified by the cache controller 50 based on whether the identified memory line has been modified as determined from an access of the corresponding Tag 1 buffer address tag. That is, a long move-out will be requested by the system controller 20 for a private operand memory line. A long move-out is performed if the memory line has been modified. Conversely, if a long move-out of an unmodified operand memory line is requested, the cache controller 50 issues an abort long move-out signal to the system controller 20 and performs a short move-out. In any case, the address tag of the memory line identified by the data integrity move-out request is accessed and marked invalid (long move-out) or public (short move-out). If the data integrity move-out Op Code indicates that the move-out memory line is a member of a line pair, the companion line pair member is simultaneously moved out. Whether the move-out of the companion line pair member is long or short is determined by the system controller 20 as qualified by the cache controller 50. Depending on the type of move-out actually performed on the companion line pair member, its Tag 1 address tag is accessed and marked either public or invalid. Regardless, the line pair bit of both address tags of the line pair are reset in the Tag 1 buffer 48.

In accordance with the present invention, one exception exists in the performance of data integrity move-outs. In performing the data integrity search of the Tag 2 buffer 60, the system controller 20 determines whether a proper line pair could be created on move-in of the requested memory line. That is, if the data integrity search of the Tag 2 buffer 60 finds a matching memory line held in the complimentary instruction or operand buffer 52, 54 of the original move-in memory line requesting CPU 12, 12', the system controller 20 will recognize the potential for creating a line pair by the move-in of the requested memory line. The system controller 20 will therefore not perform a data integrity move-out with respect to this potential line pair memory line. Instead, the system controller 20 will defer action until the move-in memory line address tag is accessed in the Tag 1 buffer 48. At that time, the system controller 20 will update the address tag of the preexisting line pair member to establish the necessary information to indicate that the preexisting and move-in lines now present in the instruction and operand buffers 52, 54 are mutual members of a line pair.

After all data-integrity move-outs have been completed, the system controller 20 provides the requested move-in line to the storage unit 18 that originally placed the move-in request with the system controller 20. The information provided to the storage unit 18 by the system controller 20 to initiate the actual move-in of the requested memory line is summarized in Table IX.

TABLE IX

| MI Line Request | #Bits |
|---|---|
| Move In Op Code | 8 |
| System Address <SA3:19> | 17 |
| IF/OP Memory Line | 1 |
| Associativity | 1 |
| Public/Private | 1 |
| Tag Index | 9* |
| Create IF/OP Line Pair | 1 |
| Line Pair Associativity | 1 |
| OP Pair EA17 | 1** |

*Only 8 bits <EA18:19> if an IF MI
**Only used for IF MI

Since the storage unit 18 will likely have been involved in other storage unit related operations while awaiting the return of its move-in requested line, the system controller essentially repeats the original move-in line request to provide the necessary information for the storage unit 18 to uniquely identify the memory line being moved-in, where it is to be stored in the split cache 46 and whether and where a line pair is to be created. At the same time the system controller issues its version of the move-in line request, the mainstore unit 22 typically begins providing the requested move-in memory line via the switch box 24 and the appropriate one of the CPU mainstore data lines 34, 36 as selected by the system controller 20 via control lines 32. Accordingly, the storage unit 18, on receipt of the system controller move-in line request, immediately begins accepting the move-in memory line. In the preferred embodiment of the present invention, the memory line is transferred in four cycles of 16 bytes each. During the fourth move-in data transfer cycle, the move-in and any preexisting line pair member address tags are written and updated, respectively.

Figure 2:
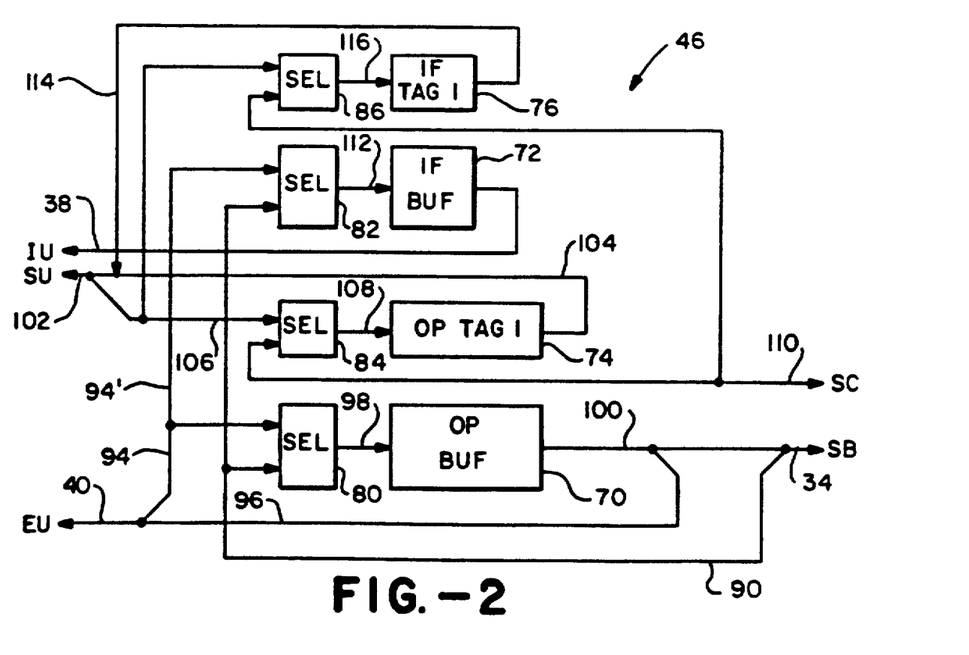
FIG. 2 is a detailed block diagram of a split instructor and operand cache constructed in accordance with a preferred embodiment of the present invention.

Referring now to FIG. 2, the data paths and principal elements of the split cache 46 are shown. A memory line destined for the operand buffer 70 is received from the CPU memory line data bus 34 onto an internal memory line input bus 90 as one of two inputs to a selector 80. A second input to the selector 80 is from the execution unit 16 via the CPU-internal operand bus 40 and operand return bus 94. Upon receiving a system controller memory line move-in request, the cache controller 50 further provides the IF/OP selection, tag index and memory line associativity of the move-in request to the instruction and operand buffers 70, 72 to select a unique memory line destination storage location. That is, if the IF/OP selection made by the move-in request specifies that the memory line provided onto the internal memory line input bus 90 is destined for the operand buffer 70, the cache controller 50 configures the selector 80 to pass the memory line data present on the memory line input bus 90 to the operand buffer 70 via the selector output bus 98. For an instruction buffer destined memory line, the cache controller will instead configure a selector 82 to pass the memory line to the instruction buffer 72 via the selector output data bus 112 for storage in the tag index and associativity designated storage location.

During the fourth and final memory line transfer cycle of the move-in, the cache controller further configures one or both of the Tag 1 selectors 84, 86 for the updating of the instruction and operand address tags. The necessary Tag 1 update information is provided by the system controller as part of the system controller move-in request via control lines 110 (a subset of the system controller control lines 26). Specifically, the choice to configure both selectors 84 for address tag access is based on the create line pair bit of the system controller move-in request. The system address, public/private, tag valid and line pair related tag update information is received from the system controller 20 by the selectors 84, 86 for their respective instruction and operand Tag 1-buffers 74, 76. The storage location of the address tags to be updated is obtained by the cache controller 50 from the system controller 20 move-in request provided information and applied to the selection of a memory line storage location in the instruction and operand buffers 70, 72. The address tags thus written, if for a line pair, are largely identical, though differing in that they are written with complimentary information identifying the location of their pair member location in the instruction or operand buffers 70, 72.

The split cache 46 supports the reading of partial memory lines (double word) from the instruction buffer 72 in response to an instruction fetch request by the instruction unit 14. Similarly, partial memory lines are transferred to or from the operand buffer 70 either as part of a memory line move-out or the transfer of operands to the execution unit 16. For an instruction fetch, the requested instruction is extracted from the partial instruction memory line as obtained from the instruction buffer 72, aligned and then provided to the instruction unit 14 via the CPU-internal instruction bus 38. For a memory line move-out, the operand buffer 70 acts as a source of four 16-byte data transfers occurring in four data transfer cycles. The cache controller 50 effectively transfers the quarter-memory line segments onto the CPU memory line data bus 34 by way of the operand buffer output data bus 100. Conversely, where operands are being read from the operand buffer 70 to the execution unit 16, double word operands are transferred onto the CPU-internal data bus 40 via the operand output data bus 96.

With the return of operands from the execution unit 16, the cache controller performs an update operation on the address tag corresponding to the operand data returned to the operand buffer 70. That is, the selector 84 is configured by the cache controller to pass address tag update information provided by the cache controller, via cache control tag lines 102, to an input 106 of the selector 84 at the same time the execution unit operand data is returned to the operand buffer 70. The operand memory line Tag 1 address tag is generally updated simply to mark the memory line receiving the operand as having been modified.

In accordance with the present invention, operands originated or modified by the execution unit 16 may also be written back to the instruction buffer 72 at the same time they are written into the operand buffer 70. Normally, only complete memory lines are written into the instruction buffer 72 in response to an instruction memory line move-in request issued to the system controller 20. However, where a line pair exists in the split cache 46 and the operand buffer member is written to with operand data from the execution unit 16, the present invention provides for the instruction buffer resident member of the line pair to be equivalently modified Accordingly, the cache controller 50 configures the selector 82 to write modified operand data to a memory line pair member present in the instruction buffer 72 simultaneous with the writing of the same operand data to the corresponding memory line pair member in the operand buffer 70. As before, the cache controller 50 updates the corresponding memory line address tag present in the operand Tag 1 buffer 74 to indicate the modified status of the operand memory line. The address tag of an instruction memory line of a line pair need not be correspondingly accessed, since the Tag 1 modified data bit for an instruction memory line is not defined and no other address tag information need be updated.

In the preferred embodiment of the present invention, the operand data lines 94' are limited data width such that only operands that are less than 8 bytes wide or 8 bytes half word aligned can be written from the execution unit 16 to a memory line stored in the instruction buffer 72. Execution unit operands of up to 32 bytes, aligned or unaligned, can be written to a memory line in the operand buffer 70. Where an operand returned by the execution unit 16 is not capable of being written into the instruction buffer 72 via data bus lines 94', the cache controller 50 instead invalidates the instruction buffer line pair member during the otherwise normal update access of the instruction Tag 1 buffer 76. The update operation performed on the address tag of the operand Tag 1 buffer 74 to change the state of the modified bit will further reset the operand IF/OP line pair state bit if the instruction line pair member is invalidated. Thus, the line state pair status is effectively destroyed and the instruction line pair member invalidated, though the operand memory line continues to validly exist in the operand buffer 70.

An operand store invalidation of the instruction Tag 1 address tag without any notice to the system controller 20, however, creates the potential for a line pair inaccuracy to subsequently occur as between the instruction and operand Tag 1 address tags. Such a condition is defined as a ghost line pair state. That is, the operand address tag will reference a nonexistent or ghost instruction address tag as a mutual member of a line pair.

This ghost line pair state can arise if the system controller 20 moves-in the operand line pair member after an operand store invalidation of the line pair companion memory, but without an intervening operand Tag 1 address tag invalidation or move-in into the instruction buffer 72 at the instruction line pair tag index and associativity. Following the instruction address tag invalidation, another CPU 12' must request the operand memory line with only public privileges and the system controller 20 must only update the operand Tag 1 address tag as now being held public. The operand memory line must then be requested back by the CPU 12, again with private privileges. In making the required move-in, based on the contents of the Tag 2 buffer 60, the system controller 20 will perform a short move-in updating the Tag 1 address tags of both the still invalid instruction and operand memory lines to indicate that they are mutual members of a line pair. No check is made as to whether the instruction Tag 1 address tag is marked invalid. However, this seeming error in the management of line pair states does not result in any degradation of the operation of the split cache 46. The instruction and operand Tag 1 buffers 74, 76 remain accurate with respect to the memory lines contained in the respective instruction and operand memory line buffers 70, 72. That is, requests for instructions or operands by the instruction and execution units 14, 16 are handled by the storage unit 18 based on respective cache controller searches of the instruction and operand tag 1 buffers 74, 76. Such cache controller searches do depend on the Tag 1 address tag valid bit and are therefore independent of the presence of a ghost line state.

The ghost state is tolerated even where the remaining valid operand memory line of the ghost line pair is again accessed for the storage of an execution unit modified operand. The modified operand is, as before, simultaneously written to the memory line member in the instruction buffer 72, even though it exists as a ghost. This blind update of the instruction Tag 1 buffer is a consequence of the line pair marked address tag present in the operand Tag 1 buffer 74 indicating the presence of the instruction memory line member of the pair. The cache controller 50 does not update the address tag of the invalid memory line present in the instruction buffer 72 where the store of the operand data to the instruction buffer 72 is possible. Where the operand instruction buffer store cannot be made due to the instruction buffer access limitation of the data bus 94', the subsequent access of the instruction Tag 1 buffer 96 merely invalidates the already invalid instruction buffer address tag.

Notably, the ghost member of a ghost line pair is always invalid. If an instruction memory line move-in request is completed with respect to the same tag index instruction storage location as the ghost, a valid line will exist there. The moved-in memory line can be either the same memory line as the ghost memory line or another memory line having the same tag index. If the memory line is the same as the ghost, then the line pair validly exists. Subsequent operand writes to an instruction line pair member are proper. Conversely, if a different memory line is moved-in, then the line pair bit of the operand address tag will have been corrected during the swap move-out process invoked in response to the instruction move-in request. That is, the original move-in request identifies the ghost instruction memory line for swap move-out, independent of the line being invalid. The system controller 20 responds by requesting the instruction move-out, including the identification of the ghost memory line as a member of a line pair. As before, the cache controller simply invalidates the instruction memory line by an update of its instruction Tag 1 address tag. Also, based on the line pair identification of the swap move-out line, the operand Tag 1 address tag is accessed specifically to reset the operand address tag line pair bit.

Thus, a computer system architecture including multiple CPUs with split instruction and operand caches and allowing for the simultaneous existence of otherwise identical memory lines in both the instruction and operand caches of a single CPU managed through the implementation of a line pair state for each identical pair of memory lines, has been described.

In light of the above teachings, many modifications and variations of the present invention are possible. It is therefore to be understood that within the scope of the appended claims, the invention may be practiced otherwise than as specifically described above.

We claim:

1. Apparatus, for use in a data processing system including a memory unit providing for the storage of data lines, for managing the transfer and storage of data lines for use by an instruction unit and an exception unit of a central processing unit, each data line having a corresponding system memory address, said apparatus comprising:
   a) a first cache memory coupled to the central processor unit for the transfer of data lines to the instruction unit and from both the instruction and execution units to said first cache memory;
   b) a second cache memory coupled to the central processor unit for the transfer of data lines between the execution unit and to said second cache memory;
   c) determining means, responsive to the instruction and execution units, for determining whether a data line having a predetermined system memory address is stored in both said first and second cache memories;
   d) selector means, responsive to said determining means and coupled between said execution unit and said first cache memory, for enabling the transfer of a data line processed by the execution unit to said first cache memory simultaneously with the transfer of the processed data line to said second cache memory; and
   e) control means for controlling the transfer of data lines between the memory unit and the central processor unit, said control means determining whether the corresponding system memory address of a data line transferred by said control means to either said first or second cache memory is the same as that of a data line present in either said second or first cache memory, respectively, said control means including means for storing line-pair control data with respect to a pair of data lines respectively present in said first and second cache memories and having the same corresponding system memory addresses.

2. The apparatus of claim 1 wherein said determining means is responsive to line-pair control data corresponding to the respective data present in said first and second cache memories in determining whether a data line having a predetermined system memory address is stored in both said first and second cache memories.

3. The apparatus of claim 2 wherein said determining means includes first means for storing the corresponding system memory addresses of the respective data lines present in said first and second cache memories, and wherein said control means includes second means for storing the corresponding system memory addresses of the respective data lines present in said first and second cache memories.

4. The apparatus of claim 3 wherein said control means includes means for comparing the corresponding system memory address of a data line being transferred with respect to said first and second cache memories with the respective corresponding system memory addresses stored by said second storing means.

5. Apparatus for managing the transfer of data within and with respect to a central processing unit and a main store for processing and storing data, respectively, wherein the central processing unit includes an instruction unit and an execution unit, each data transferred having a corresponding system memory address, said apparatus comprising:
   a) a first cache memory provided within said central processor unit, said first cache memory providing for the storage of data;
   b) a second cache memory provided within said central processor unit, said second cache memory providing for the storage of data;
   c) means, coupled to said execution unit and said main stores, for selectably transferring data to said first cache memory, said second cache memory, or concurrently to both said first and second cache memories; and
   d) control means for determining whether data having a system address corresponding to a predetermined system memory address is present in said first cache memory, said second cache memory, or both said first and second cache memories, and for providing a result status corresponding thereto, said control means including means for storing said result status in correspondence with said data present in said first and second cache memories having a system memory address corresponding to said predetermined system memory address; and
   e) means, responsive to said determining means, for associating said result status with the respective data having said predetermined system memory address; and
   f) means for detecting whether the system memory address of data being transferred to said first or second cache memory is corresponds to the system memory address of data already present in both said first and second buffer memories, said detecting means controlling said selectably transferring means so that the transfer of said data being transferred to said first or second cache memory is to both said first and second cache memories.

6. The apparatus of claim 5 wherein said first and second cache memories respectively comprise first and second primary tag buffers and first and second data buffers providing respective storage locations for data and the corresponding system memory addresses.

7. The apparatus of claim 6 wherein said apparatus further comprises a secondary tag buffer for maintaining respective copies of the system memory addresses stored in said first and second primary tag buffers.

8. In a data processing system including a central processing unit, a system controller and a mainstore memory unit, wherein data lines, each having a predetermined line address, are transferred therein between, wherein said central processing unit includes a cache memory having an instruction buffer for storing a plurality of instruction data lines, an operand buffer for storing a plurality of operand data lines and a first tag buffer for providing a plurality of storage slots for the respective storage of a first plurality of line addresses and corresponding control data, wherein said system controller includes a second tag buffer for providing a plurality of storage slots for the respective storage of a second plurality of line addresses and corresponding control data, wherein an improvement in said system provides for the control of transfers of data lines having the same line address as data lines stored in said instruction buffer or said operand buffer of said central processing unit, said improvement comprising:
  a) first status bit means for storing a respective buffer-pair control data with each storage slot of said first tag buffer, the storage of buffer-pair control data indicating whether the corresponding line data is stored in both said instruction and operand buffers of said central processing unit;
  b) second status bit means for storing a respective buffer-pair control data with each storage slot of said second tag buffer, the storage of buffer-pair control data indicating whether the corresponding line data is stored in both said instruction and operand buffers of said central processing unit;
  c) first control means, coupled to said second tag buffer, for determining whether a predetermined data line being transferred to either said instruction buffer or second operand buffer has the same line address as any data line present in either said operand buffer or said instruction buffer, respectively, or both and for correspondingly updating the buffer-pair control data of said second status bit means;
  d) second control means, coupled to said first tag buffer, for determining whether said predetermined data line transferred to either said instruction buffer or said operand buffer has the same line address as any other data line present in either said operand buffer or said instruction buffer, respectively, or both; and
  e) selector means, responsive to said second control means, for selectively storing a data line to either said instruction buffer or said operand buffer, or both, and for correspondingly updating the buffer-pair control data of said first status bit means.

9. A cache control system for controlling the transfer of data lines within a data processing system generally with respect to a central processor unit, wherein the central processor unit includes an instruction unit and an execution unit and wherein each data line transferred has a data address, said cache control system comprising:
  a) an instruction cache for storing data lines for use by the instruction unit;
  b) an operand cache for storing data lines for use by the execution unit;
  c) cache control means, responsive to the instruction and execution units, for enabling the transfer of data lines from said instruction cache exclusively to said instruction unit, from said operand cache exclusively to said execution unit, from said execution unit to said operand cache, and from said execution unit simultaneously to said instruction and operand caches,
  said cache control means including means for determining whether the data address of a predetermined data line transferred from said execution unit is the same as that of a respective data line present in said instruction and operand caches, said cache control means being responsive to said determining means for enabling the simultaneous transfer of said data line transferred from said execution unit to both said instruction and operand caches when both said operand and instruction caches store a data line having the same data address as said data line being transferred from said execution unit, said cache control means including line-pair storing means for storing line-pair control data with respect to a pair of data lines respectively present in said instruction and operand cache memories and having the same data addresses.

10. The cache control system of claim 9 wherein said line-pair storing means includes a data line tag store for respectively storing the data addresses of the data lines stored by said instruction and operand caches and wherein each data address storage location in said data line tag store includes a line-pair status data storage location for storing line-pair control data indicating whether the corresponding data line as stored by said instruction or operand caches is a member of a pair of data lines having the same data address and cache location of the corresponding other member of the line pair of data lines, said determining means being coupled to said data line tag store for determining whether a data line having the same data address as said data line being transferred from said execution unit exists in said instruction and operand caches and whether any such existing data line is a member of a line-pair of data lines.

11. The cache control system of claim 10 wherein said cache control means further includes update means for storing line-pair control data in said line-pair status data locations of said data line tag store, said update means being responsive to said cache control means for storing line-pair control data with an data address of a data line when a data line is transferred with respect together said instruction cache or said operand cache, or both to indicate whether the data line transferred is a member of a line-pair of data lines.

12. The cache control system of claim 10 or 11 wherein the transfer of data lines also occurs with respect to a data storage unit of the data processing system, said cache control system further including a system controller for controlling the transfer of data lines between the central processor unit, the data storage unit, and other central processor units coupled to the data storage unit, said system controlled including a system data line tag store for respectively storing the data addresses of the data lines stored by said instruction and operand caches of each central processing unit coupled to the data storage unit and wherein each data address storage location in said system data line tag store includes a line-pair status data storage location for storing line-pair control data indicating whether the corresponding data line as stored by said instruction or operand caches of a central processor is a member of a pair of data lines having the same data address and the cache location of the corresponding other member of the line pair of data lines, said system controller including means, responsive to said cache control system and coupled to said system data line tag store, for determining the line-pair control data to be stored by said update means of a central processor unit upon transfer of a data line to such central processor unit.

* * * * *